Jan. 14, 1958  D. LORIE  2,819,594
METHOD OF HANDLING METALLIC CONTAINERS
Filed Jan. 26, 1955
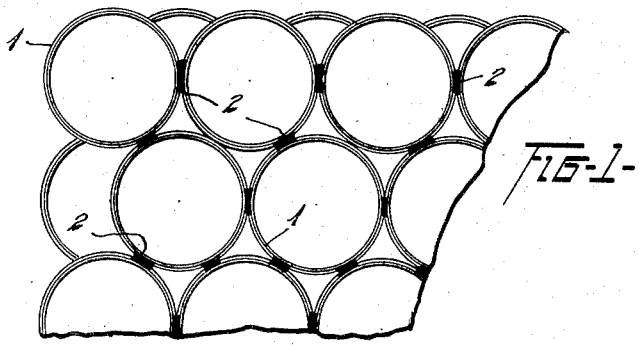
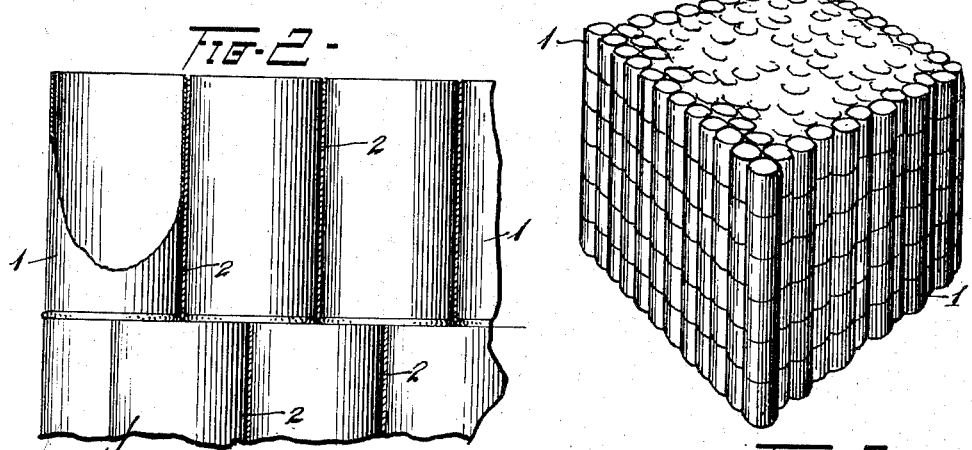
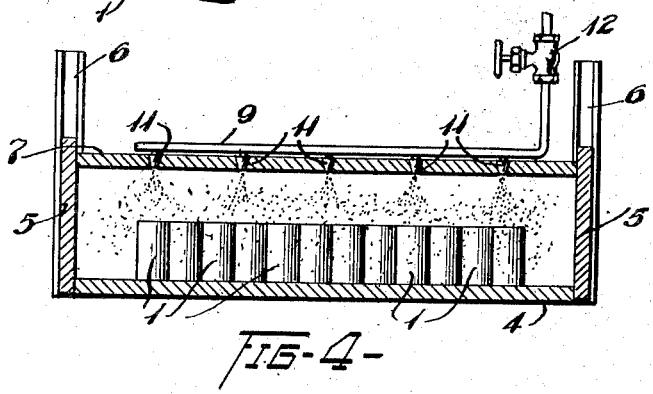
INVENTOR.
Douglas Lorie
BY

United States Patent Office 2,819,594
Patented Jan. 14, 1958

2,819,594
METHOD OF HANDLING METALLIC CONTAINERS

Douglas Lorie, Palm Beach, Fla.

Application January 26, 1955, Serial No. 484,099

2 Claims. (Cl. 62—170)

This invention relates to a method of handling metallic containers and a slab of frost-bonded metallic containers.

A problem for many years has been handling of empty metallic containers, commonly called tin cans. The storage, transportation and handling of these items have been time-consuming, expensive procedures. This invention makes the handling, transportation and storage of these items simple and economical.

An object of this invention is to provide a slab of empty tin cans bonded by a quick-frozen moisture line at the joinder of adjacent cans.

Another object of this invention is to provide a process for handling empty tin cans as a frozen slab.

A further object of this invention is to provide a block of abutting tin cans, bonded by quick-freezing moisture at the point of contact of the abutting cans.

A still further object of this invention is to provide a simple and economical process for handling empty tin cans.

The foregoing and other objects and advantages of this invention will be more apparent from reading the following specifications, in conjunction with the drawings forming a part thereof, wherein:

Fig. 1 is a plan view of a block of rows of abutting cans frost-bonded at contact points;

Fig. 2 is fragmentary side elevational view of a block of rows of abutting cans frost-bonded at contact points;

Fig. 3 is a perspective view of a block of frost-bonded slabs of cans; and,

Fig. 4 is a cross-sectional view of a freezing chamber device for frost-bonding slabs of cans and blocks of said slabs; parts shown in elevation.

Referring to the drawings, wherein like members are given the same reference numeral, tin cans 1 are arranged in rows with their periphery abutting. Moisture is provided at the abutting lines and quick-frozen to form a frost-bond 2 between adjacent cans, thus providing a slab of cans bonded by the frozen moisture. These slabs may be superimposed one on the other with the cans aligned, or preferably off-set, to provide a frozen block of cans frost-bonded.

A satisfactory method of effecting the frost-bond 2 between the cans 1 is spraying a fine mist into a chamber containing a course of abutting can 1 and quick-freezing the condensed mist. The quick-freezing is preferably effected in a reduced pressure chamber.

A suitable means for effecting the frost-bond is illustrated in Fig. 4. This means comprises a chamber having a bottom 4, sliding ends 5 mounted in vertically grooved frame members 6 providing guideway means, and a top 7. A supply of water is provided under pressure through a closed conduit 9 connected with a plurality of spray-heads 11 positioned in the chamber top 7. A control valve 12 is provided in the supply conduit 9. Conventional refrigeration means are connected with the chamber, and an exhaust pump of conventional type may be associated with the chamber. These are conventional and well known in the art, and form no part of this invention.

In operation a course of rows of empty cans 1 are positioned to form abutting cans in adjacent rows and courses, these cans 1 are sprayed with a fine mist which condensed at abutting points of adjacent cans 1. By quick-freezing, the condensed moisture forms a frozen bond 2 between the cans at abutting points, thus forming a slab of cans 1 which can be handled with conventional equipment, such as lift-forks and the like. Slabs of cans so bonded can be superimposed, in alignment or off-set, and sprayed and frozen as set forth for the slabs to provide a block of empty cans frost-bonded. The blocks (see Fig. 3) may be conveniently bonded with conventional mechanical equipment.

After frost-bonding, the slab or block of cans are maintained under refrigeration below 0° C. for storage and transportation. When it is desired to use the cans, they are thawed, preferably on assembly-line conveyors, at the cannery.

Experience has taught that the frost-bond is of sufficient strength for handling usual bulk of slabs and blocks of cans. However, if extreme size slabs and blocks are desired, it is desirable to provide a light-weight bed, such as a conventional aluminum bed, for the slab or block, which bed is preferably used as a base or platform for the cans in the freezing chamber when the slab or block is formed.

The invention has been described in detail, but it is clearly understood that it is not so limited; many changes can be made therein, without departing from the spirit and scope thereof, as defined in the appended claims.

Having thus described the invention what is claimed is:

1. A method of preparing a plurality of empty containers for handling and storing comprising arranging said containers in abutting relationship, spraying said containers with a fine aqueous mist, freezing a moisture line between adjacent containers and at said point of abutting relationship, and maintaining said containers below freezing.

2. A method of preparing a plurality of empty metallic containers for handling and storing comprising arranging said containers in abutting courses of rows, spraying said containers with a fine aqueous mist frost-bonding said containers at abutting points, and handling said bonded courses of rows of containers as a slab.

References Cited in the file of this patent

UNITED STATES PATENTS

| | | |
|---|---|---|
| 1,140,178 | McDougall | May 18, 1915 |
| 1,571,049 | Gatchell | Jan. 26, 1926 |
| 1,745,929 | Grimmeisen | Feb. 4, 1930 |
| 2,176,764 | Gross | Oct. 17, 1939 |
| 2,387,921 | MacDonald | Oct. 30, 1945 |
| 2,453,667 | Lambert | Nov. 9, 1948 |
| 2,550,815 | Inwood | May 1, 1951 |
| 2,643,524 | Wilbushewich | June 30, 1953 |
| 2,676,471 | Pierce | Apr. 27, 1954 |
| 2,667,460 | Johnson et al. | May 4, 1954 |